United States Patent [19]

Ohkubo

[11] Patent Number: 5,123,063
[45] Date of Patent: Jun. 16, 1992

[54] IMAGE PROCESSOR UTILIZING AND CONTROLLING A PLURALITY OF SCANNERS

[75] Inventor: Kenji Ohkubo, Saitama, Japan
[73] Assignee: Fuji Xero Co., Ltd., Tokyo, Japan
[21] Appl. No.: 595,596
[22] Filed: Oct. 10, 1990
[51] Int. Cl.⁵ .......................... G06K 9/20; G06K 9/00; G06K 7/00; H04J 3/16
[52] U.S. Cl. ........................ 382/58; 382/62; 358/408; 358/434; 370/79
[58] Field of Search .............. 382/58, 61, 62, 1; 358/404, 439, 434, 435, 436, 468, 442, 408, 425; 370/79, 110.1; 379/100

[56] References Cited

U.S. PATENT DOCUMENTS

| | | | |
|---|---|---|---|
| 3,889,057 | 6/1975 | Perreault | 358/439 |
| 4,244,007 | 1/1981 | Vandling | 358/439 |
| 4,661,857 | 4/1987 | Kondo | 358/439 |
| 4,746,986 | 5/1988 | Tanigawa | 358/442 |
| 4,961,185 | 10/1990 | Sawada | 370/79 |
| 4,965,676 | 10/1990 | Ejiri et al. | 358/404 |
| 4,970,603 | 11/1990 | Kanai | 358/434 |

Primary Examiner—Michael Razavi
Assistant Examiner—Michael Cammarata
Attorney, Agent, or Firm—Finnegan, Henderson, Farabow, Garrett and Dunner

[57] ABSTRACT

An image processor employing a plurality of types of scanners including a stored table in which identification numbers allotted to the scanners and scanner control information are registered in pairs, a controller for registering the identification number of a scanner from the operator of the image processor, a controller for requesting the scanner to transmit an identification number representative of its type and receiving such identification number, a controller for setting the registered identification number as the identification number of the scanner when the scanner fails to transmit its identification number within a predetermined amount of time, a reading controller for reading from the stored table scanner control information corresponding to the identification number of the scanner, and a controller to control the scanner in a manner to conform with the scanner control information.

5 Claims, 3 Drawing Sheets

| SCANNER ID | DATA STRUCTURE | ----- | SYNCHRONIZA-TION PROCESSING | BUFFER RESTRICTIONS | STATUS CONVERSION TABLE | |
|---|---|---|---|---|---|---|
| S001 | COLORED, FACE SEQUENCE, A3, 400 dpi | ----- | SYNCHRONIZA-TION PROCESSING SY1 | NONE | T01 | |
| S002 | MONOCHROME, MULTIARY, A3, 300 dpi | ----- | SYNCHRONIZA-TION PROCESSING SY1 | NONE | T02 | |
| S003 | MONOCHROME, BINARY, A4, 300 dpi | ----- | NONE | BUFFER PROCESSING | T03 | |

IMAGE PROCESSOR UTILIZING AND CONTROLLING A PLURALITY OF SCANNERS

BACKGROUND OF THE INVENTION

1. Field of the Invention

The present invention relates to an image processor which may be used in cases where an image is received by selecting a desired scanner from among a plurality of scanners.

2. Discussion of the Related Art

With progress in office automation, a system has been developed in which cables are laid in offices, and document processors such as work stations and various input/output devices are connected to the cables so as to make effective use of various items of information.

FIG. 4 illustrates essential portions of such a system. Image processors 12-1, 12-2, . . . , typified by work stations, scanners 13-1, 13-2, . . . , for inputting images, printers 14-1, 14-2, . . . , for printing out images, and so on are connected to a cable 11 constituting a local area network. For instance, the operator of the first image processor 12-1 is capable of inputting an image by selecting a desired scanner from among the scanners 13-1, 13-2, . . . , by taking into account various conditions such as the fact that the document to be read is a color document, or is large in size. The same holds true of the selection of a printer from among the printers 14-1, 14-2, . . . . In such a system, it is possible to add additional devices to the cable 11, including new scanners and printers, as well as a mail server 15 and a communication server 16, as required.

The different types of scanners employ a number of different methods of transferring image information. For instance, the first scanner 13-1 has a large-capacity buffer memory, and is arranged such that after one page of image information is read, the image information is transferred to the image processor 12. In cases where the image processor 12 receives the image information transferred from the scanner 13-1, there is no need to take the reading speed of the scanner 13-1 into consideration.

Meanwhile, if it is assumed that the second scanner 13-2 is a synchronous-type scanner with a relatively small-capacity buffer memory, the transfer of image information is carried out in predetermined unit amounts in synchronism with the image processor 12. At this time, the mode of transfer of image information will also vary depending on the amount of data that can be handled by the image processor 12 and the scanner 13-2.

In the above, a description has been given of the types of scanners in connection with a buffer and the presence or absence of synchronization with the image processor. The scanners can be classified into more kinds depending on the types of data, such as the image information being color information, binary data, or data in a form other than base 2. It has been the practice, among others, to finely adjust a method of transferring signals to enable communication with the scanner 13 or to install an interface circuit on the image processor 12 at the time the image processor 12 has selected a desired scanner 13.

With such conventional techniques, however, each time a scanner 13 is selected, it is necessary to perform operations such as exchanging the interface circuit or adjusting each circuit terminal in order to make the image processor correspond to the scanner. Also, in cases where signal processing is controlled by software, it has been necessary to alter the program. Such operations are time-consuming and expensive. Hence, even though the various types of scanners 13-1, 13-2, . . . , are connected to the cable, it has been impossible to make efficient use of them.

It is possible to eliminate the burden on the image processor side by making common use of the scanners themselves. However, in the such attempts for common use have required that the functions peculiar to the individual scanners be ignored.

SUMMARY OF THE INVENTION

The present invention has been made in view of the above circumstances and has as an object to provide an image processor capable of selecting a desired scanner from a plurality of scanners of different types which are connected to the image processor and retain the ability to use the functions peculiar to the individual scanners, thereby overcoming the above-described drawback of the conventional art.

A second object of the present invention is to provide an image processor capable of effectively controlling a selected scanner where the operator is not knowledgeable about the respective capabilities of the respective scanners.

A third object of the present invention is to provide an image processor capable of effectively controlling a selected scanner irrespective of whether the scanner itself is capable of declaring its type.

Additional objects and advantages of the invention will be set forth in part in the description which follows and in part will be obvious from the description, or may be learned by practice of the invention. The objects and advantages of the invention may be realized and attained by means of the instrumentalities and combinations particularly pointed out in the appended claims.

To achieve the objects and in accordance with the purposes of the invention, as embodied and broadly described herein, an image processor employing a plurality of types of scanners having associated scanner identification numbers comprises scanner identification table means for storing identification numbers allotted to the scanners and associated scanner control information, scanner interrogation means for requesting a selected scanner to transmit the scanner identification number associated therewith and for reading from the scanner identification table means the scanner control information associated with the transmitted scanner identification number, and scanner control means for controlling the selected scanner in accordance with the scanner control information read from the scanner identification table.

BRIEF DESCRIPTION OF THE DRAWINGS

FIG. 1 is a block diagram illustrating an image processor and its peripheral equipment;

FIG. 2 is a diagram illustrating a part of the contents of a scanner table;

FIG. 3 is a flowchart illustrating the manner of controlling the image processor when image information is inputted from a scanner; and FIG. 4 is a system configuration diagram illustrating a general configuration of a local area network.

DESCRIPTION OF THE PREFERRED EMBODIMENT

Referring now to the accompanying drawings, a detailed description will be given of a preferred embodiment of the present invention.

Figure 1:
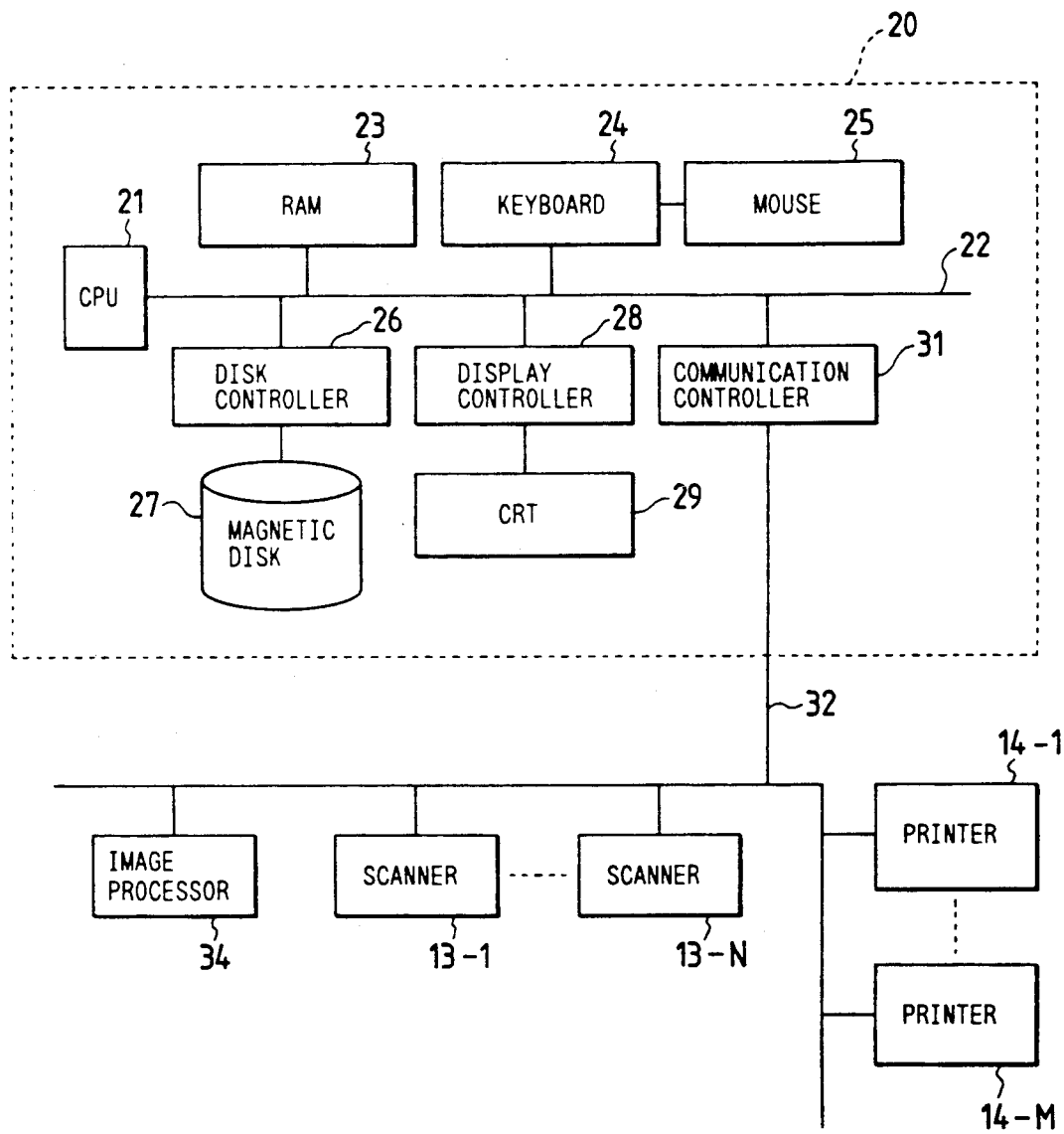
FIGS. 1 to 4, which are incorporated in and constitute a part of this specification; illustrate an embodiment of the invention and; together with the description; serve to explain the objects, advantages, and principles of the invention. In the drawings.

FIG. 1 shows a configuration of an image processor in accordance with the present invention and its peripheral equipment. This image processor 20 has a central processor (CPU) 21 connected to various circuit components via a bus 22 such as a data bus. A RAM 23 (randon access memory) stores a program and temporary data for controlling the processor 21. A keyboard 24 is connected to a mouse 25 used as a pointing device and for inputting data. A disk controller 26, which is connected to a magnetic disk 27, controls the inputting and outputting of data. The aforementioned program and the prepared document data are stored in the magnetic disk 27. A display controller 28, which is connected to a CRT 29, controls the displaying of characters and images on the CRT 29. A communication controller 31 is connected to a communication cable 32 such as a telephone line and a bus 22.

Other image processors are connected to the communication cable 32 as are a plurality of scanners 13-1 to 13-N for reading images, and printers 14-1 to 14-N for printing out images. As a whole, the system constitutes a local area network (LAN).

Figures 2, 4:
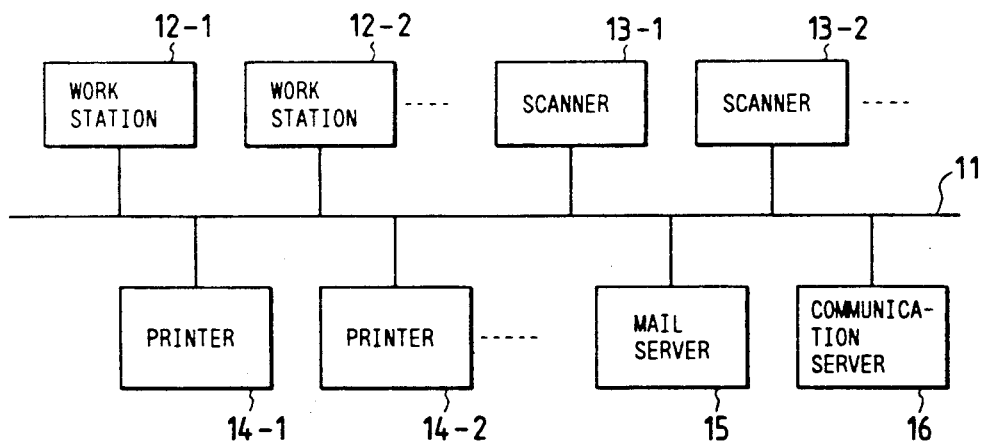

FIG. 2 illustrates the contents of a scanner table provided in the image processor shown in FIG. 1. This scanner table 41 is stored in the magnetic disk 27 as data and is transferred to a predetermined area of the RAM 23 when the image processor 20 is activated. A scanner identification number (ID) corresponding to each type of scanner is provided in the scanner table, and data representing information on controlling the relevant scanner is stored for each scanner ID.

For instance, the first scanner 13-1 shown in FIG. 1 is of a machine type having a scanner ID of "S001." In terms of the structure of image data to be transferred, the machine whose scanner ID corresponds to "S001" is a colored, face sequence system and an A3 size, with image density of 400 dpi (dots/inch). In addition, synchronization processing called "SY1" is used for this type of machine, and, consequently, buffer restrictions on the scanner side are not present. With this type of scanner, the conversion of a code transmitted from the scanner is achieved by referring to a status conversion table "T01."

In addition, in the case of a machine type whose scanner ID corresponds to "S003" in FIG. 2, the structure of the image data to be transferred is monochrome binary data and an A4 size, with image density of 300 dpi. With this type of machine, synchronization processing is not used, and the data transmission is made through buffer processing on the scanner side. In addition, the status conversion table "T01" is used to convert the code transmitted from the scanner.

In addition to the items shown in FIG. 2, data transfer units and types of commands supported by the scanners are present in the scanner table 41. Some conceivable data transfer units are a unit corresponding to the buffer, a byte unit, and a raster unit.

Figure 3:
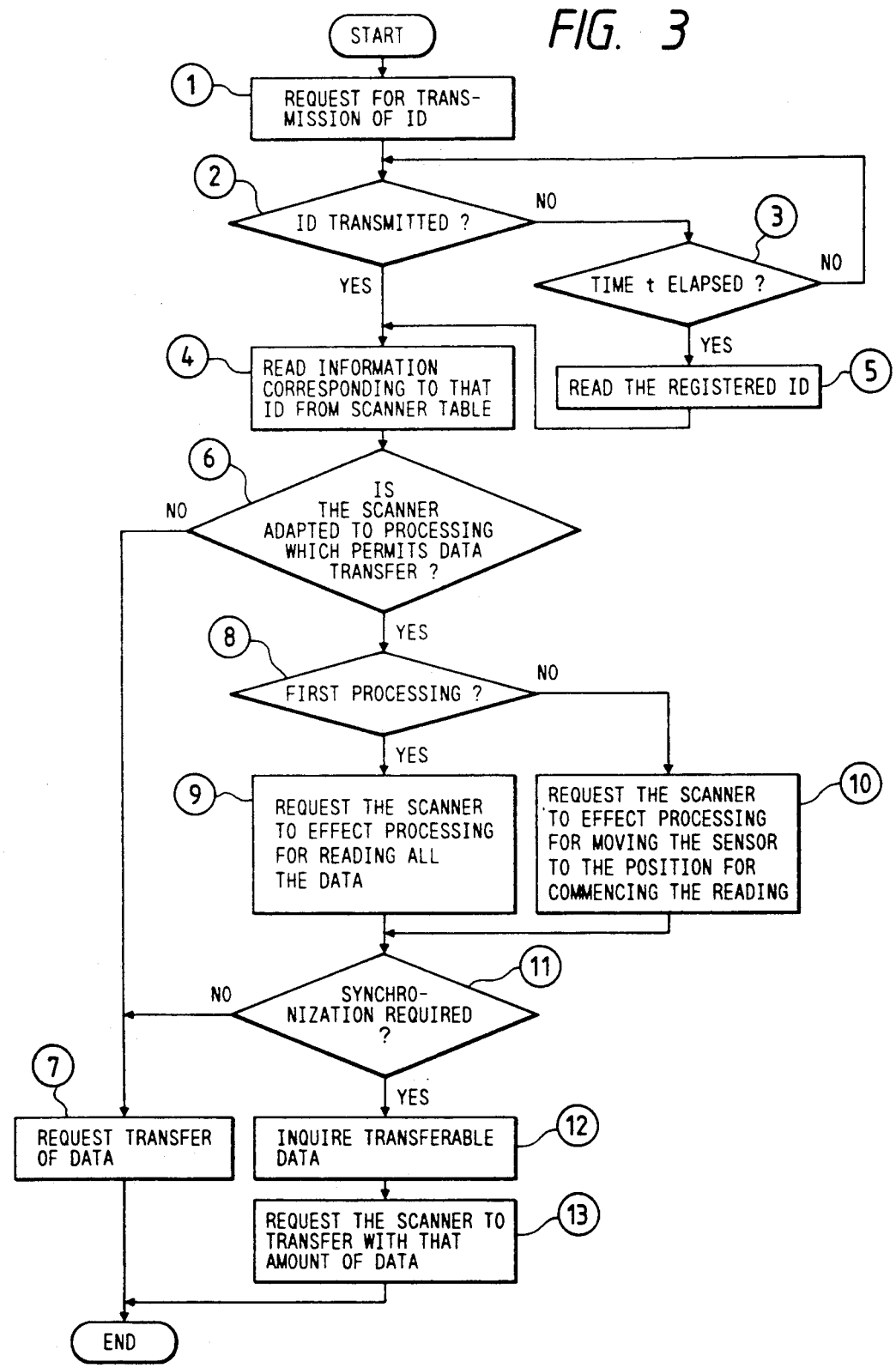

FIG. 3 illustrates the operation of the image processor having the above-described configuration. Upon selection of a scanner for transmitting image information to the image processor or connection of that scanner to the image processor, the CPU 21 (see FIG. 1) requests the transmission of an ID from the scanner prior to commencing communication of the image information (Step 1 in FIG. 3). After the request, the CPU 21 monitors for a predetermined time t whether or not the ID is transmitted (Steps 2, 3). If the ID is transmitted within the time t (Y), the CPU reads the information corresponding to that ID from the scanner table 41 (Step 4).

On the other hand, if the ID is not transmitted within time t (Step 3; Y), the ID registered in advance for that scanner is read from the RAM 23 on the image processor side (Step 5), and the information corresponding to that machine type is read from the scanner table 41 on the basis of the registered ID (Step 4). Here, ID's for the scanners are registered by inputting ID's corresponding to the types of scanners through the keyboard 24 and storing this information in a predetermined area of the RAM 23.

When the necessary information is obtained from the scanner table 41, the CPU 21, on the basis of this information, checks whether or not the relevant scanner is capable of performing various processing requests from the image processor before the transmission of data (Step 6). When the scanner cannot undergo such processing, the CPU 21 requests the scanner to commence the transmission of data (Step 7).

On the other hand, if the scanner is of a type which is capable of accepting a request for read parameters from the image processor (Step 6; Y), the CPU 21 determines whether the scanner is of a type for which the first processing is to be effected, or a type for which the second processing is to be effected (Step 8). Some possible read parameters are the designation of a position for reading the document and the designation of a selection between binary data or data in a form other than base 2.

If the scanner is of the type for which the first processing is to be made (Y), the CPU 21 requests the scanner to effect processing in such a manner as to read all of the data (Step 9). On the other hand, if the scanner is of the type for which the second processing is to be used (Step 8; N), the CPU 21 requests the scanner to move the reading element to a position for reading the document in correspondence with the read parameters.

Then, the CPU 21 determines whether or not it is necessary to synchronize the relevant scanner at the time the data is transferred (Step 11). If it is necessary to synchronize the scanner (Y), the CPU 21 requests the amount of data transferrable at a time (Step 12) and instructs the scanner to commence transferring the data by using that amount of data as the unit (Step 13). If the scanner is of a type which transfers data on a non-synchronized basis (Step 11; N), the CPU 21 instructs the scanner to commence transferring data without requesting the amount of data to be transferred (Step 7).

The image processor, for its part, prepares itself for receiving image information in correspondence with the information read from the scanner table 41, receives the image information which has begun to be transferred from the scanner in the above-described flow, and then affects that processing.

Since a table in which the contents of control are described for each type of scanner is prepared in the image processor, it is possible to control the scanners even if the operator is not knowledgeable about the characteristics of the respective scanners. Accordingly, even in cases where a plurality of scanners are connected to the image processor, it is readily possible to select a scanner from among them. In addition, since an arrangement is provided such that identification numbers representing the types of scanner can be registered, there is an advantage in that it is possible to control the scanners without knowing the details of scanner control if the operator only registers identification numbers corresponding to the types of scanners used for reading. Also, the arrangement provided is such that the identification numbers representing the types of scanner are made registrable, the aforementioned table is prepared in the image processor, and in cases where the scanner itself cannot declare its type, the scanner is controlled in correspondence with the registered identification number. Accordingly, even if the operator has made a mistake in the contents of registration, insofar as the scanner is capable of transmitting its identification number, it is possible to effect control corresponding to the same to make it possible to improve the reliability of control.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended thereto, and their equivalents.

What is claimed is:

1. An image processor employing a plurality of types of scanners having associated scanner identification numbers, comprising:
   scanner identification table means for storing scanner identification numbers allotted to said plurality of types of scanners and associated scanner control information;
   scanner interrogation means for requesting a selected scanner to transmit the scanner identification number associated therewith and for reading from said scanner identification table means said scanner control information associated with said transmitted scanner identification number if said scanner identification number is received from said selected scanner within a predetermined time period of said request; and
   scanner control means for controlling said selected scanner in accordance with said scanner control information read from said scanner identification table.

2. An image processor according to claim 1, wherein said scanner control information includes the data format for image data produced by said selected scanner as a consequence of scanning an image, data transmission mode information for image data transmitted by the scanner, and restrictions on the buffer capacity of the scanner.

3. An image processor employing a plurality of types of scanners having associated scanner identification numbers, comprising:
   scanner identification table means for storing identification numbers allotted to said plurality of types of scanners and associated scanner control information;
   means for inputting said scanner identification numbers and said associated scanner control information for said scanners for storing in said scanner identification table means;
   scanner interrogation means for requesting a selected scanner to transmit the scanner identification number associated therewith;
   means for reading from said scanner identification table means said scanner control information corresponding to the scanner identification number of a selected scanner if said scanner identification number is received from said selected scanner within a predetermined time period of said request; and
   scanner control means for controlling said selected scanner to transmit image data representing a scanned image in accordance with said scanner control information read from said scanner identification table.

4. An image processor according to claim 3, wherein said scanner control information includes the data format for image data produced by said selected scanner as a consequence of scanning an image, data transmission mode information for image data transmitted by the scanner, and restrictions on the buffer capacity of the scanner.

5. An image processor employing a plurality of types of scanners having associated scanner identification numbers, comprising:
   scanner identification table means for storing identification numbers allotted to said plurality of types of scanners and associated scanner control information;
   means for inputting and storing a scanner identification number;
   scanner interrogation means for requesting a selected scanner to transmit the scanner identification number associated therewith;
   scanner identification table access means for setting an access scanner number to a scanner identification number transmitted by said selected scanner in response to said request from said scanner interrogation means if said scanner identification number is received from said selected scanner within a predetermined time period of said request and to said scanner identification number inputted by said inputting means if no scanner identification number is received from said selected scanner within said predetermined time period;
   scanner identification table reading means for reading from said scanner identification table means scanner control information associated with said scanner identification number equal to said access scanner number; and
   scanner control means for controlling said selected scanner to transmit image data representing a scanned image in accordance with said scanner control information read from said scanner identification table means.

* * * * *

UNITED STATES PATENT AND TRADEMARK OFFICE
CERTIFICATE OF CORRECTION

PATENT NO. : 5,123,063
DATED : June 16, 1992
INVENTOR(S) : Kenji Ohkubo

It is certified that error appears in the above-identified patent and that said Letters Patent is hereby corrected as shown below:

On the title page, item [73], Assignee: change "Fuji Xero Co., Ltd."

should read --Fuji Xerox Co., Ltd.--

Signed and Sealed this

Fifth Day of October, 1993

*Attest:*

BRUCE LEHMAN

*Attesting Officer*    *Commissioner of Patents and Trademarks*